United States Patent
Bunea et al.

(10) Patent No.: US 11,485,498 B2
(45) Date of Patent: Nov. 1, 2022

(54) AIRCRAFT PASSENGER SEAT LEG REST DEPLOYMENT USING PATH AND FOLLOWER MECHANISM

(71) Applicant: B/E Aerospace, Inc., Winston-Salem, NC (US)

(72) Inventors: Catalin Bunea, Miramar, FL (US); Twinkle V. Jacob, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 71 days.

(21) Appl. No.: 17/161,858

(22) Filed: Jan. 29, 2021

(65) Prior Publication Data
US 2022/0242573 A1  Aug. 4, 2022

(51) Int. Cl.
B64D 11/06  (2006.01)

(52) U.S. Cl.
CPC ........ B64D 11/0643 (2014.12); B64D 11/064 (2014.12)

(58) Field of Classification Search
CPC .......................... B64D 11/0643; B64D 11/064
See application file for complete search history.

(56) References Cited

U.S. PATENT DOCUMENTS

| | | | |
|---|---|---|---|
| 4,470,634 A * | 9/1984 | Delius | B64D 11/0643 297/423.26 |
| 7,585,018 B2 | 9/2009 | LaPointe et al. | |
| 8,303,036 B2 | 11/2012 | Hankinson et al. | |
| 8,366,188 B2 | 2/2013 | Adams et al. | |
| 8,708,417 B2 | 4/2014 | Mejuhas | |
| 9,332,845 B2 | 5/2016 | Nagayasu | |
| 9,616,784 B2 | 4/2017 | Nagayasu | |
| 9,730,518 B1 | 8/2017 | Jacobs et al. | |
| 10,602,854 B2 | 3/2020 | Gu et al. | |
| 2012/0038196 A1 * | 2/2012 | Lawson | B64D 11/0643 297/354.12 |
| 2014/0225400 A1 | 8/2014 | Nagayasu | |
| 2015/0108817 A1 | 4/2015 | Meister et al. | |
| 2017/0021930 A1 * | 1/2017 | Henshaw | B64D 11/064 |

FOREIGN PATENT DOCUMENTS

| | | |
|---|---|---|
| CN | 107351737 A | 11/2017 |
| GB | 2560996 A | 10/2018 |
| WO | 2008107689 A1 | 9/2008 |

OTHER PUBLICATIONS

Extended Search Report in European Application No. 22154328.3 dated Jun. 15, 2022, 5 pages.

* cited by examiner

*Primary Examiner* — Anthony D Barfield
(74) *Attorney, Agent, or Firm* — Suiter Swantz pc llo

(57) ABSTRACT

A passenger seat incorporating a path and follower mechanism for nonlinear deployment of a passenger leg rest is disclosed. The passenger seat incorporates lightweight tubular members linked to backrest linkages, the backrest linkages driven by a passenger occupying the seat, e.g., via a reclining motion of the seatback. The reclining motion drives the backrest linkages which in turn drive path followers through a curving path such that, as the path follower drives forward or backward, the leg rest deploys at a variable rate between undeployed and fully deployed configurations, consistently providing an optimally relaxing leg position at any point between.

7 Claims, 7 Drawing Sheets

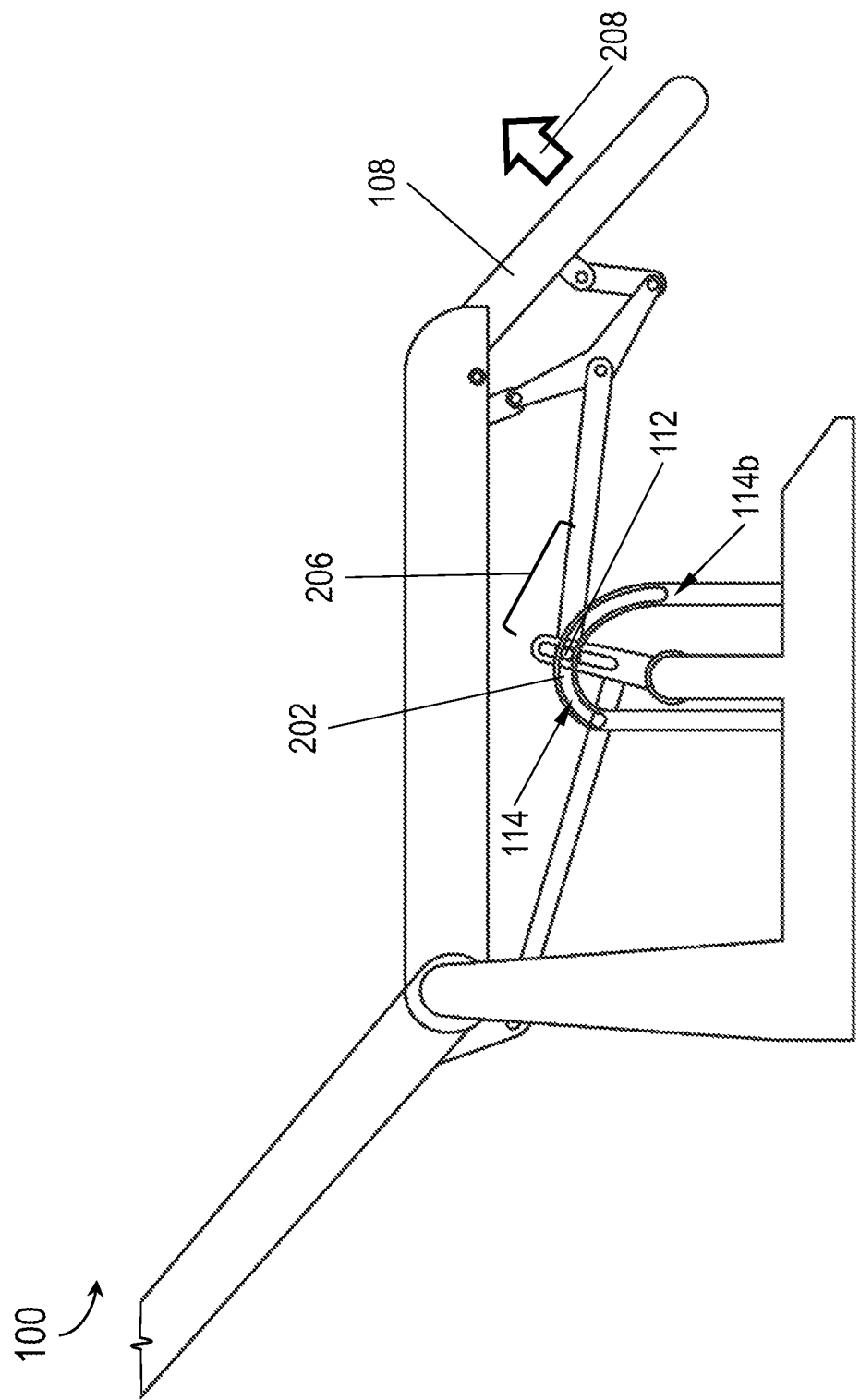

US 11,485,498 B2

AIRCRAFT PASSENGER SEAT LEG REST DEPLOYMENT USING PATH AND FOLLOWER MECHANISM

BACKGROUND

Aircraft-based passenger seats may be configured for transition between an upright configuration (e.g., capable of accommodating a seated passenger) and a berthed configuration wherein the seatback and seat cushion are substantially horizontal to allow the passenger to lie down as in a bed. The passenger seat may be configured such that the passenger can transition between upright and berthed configurations while remaining in the passenger seat. Between these two configurations, the passenger seat may additionally be capable of accommodating a reclining passenger. The passenger seat may include a leg rest similarly capable of transition to the horizontal position, extending the berthed configuration to a length comparable to a bed. However, conventional passenger seats without an independent leg rest actuator generally provide for a linear deployment of the leg rest (e.g., at a continuous rate of deployment, aligned with the reclining of the seatback) which does not provide for an optimal relaxing position for the passenger's legs in intermediate, reclining configurations. While a dedicated leg rest actuation system may provide independent control of the leg rest, conventional approaches add significant cost, complexity, and weight.

SUMMARY

An aircraft passenger seat incorporating non-linear leg rest deployment via a path and follower mechanism is disclosed. The leg rest mechanism incorporates a lightweight, tubular structure driven by the reclining of the seatback to deploy the leg rest at a non-linear rate as the seatback reclines, such that the leg rest is always at an optimally comfortable position for the reclining passenger at any intermediate configuration between upright and berthed configurations of the passenger seat.

In embodiments, the passenger seat includes a seatback reclinable relative to a seat frame (which may include a seatpan cushioned to accommodate a passenger or occupant of the seat). The passenger seat includes a leg rest for accommodating the passenger's legs and/or feet when deployed from an upright position. The path and follower mechanism includes a tubular member extending across the seat frame underneath the seatpan, e.g., between the left and right sides of the passenger seat. The tubular member is connected to, and driven forward or backward by, seatback linkages linked to the seatback (e.g., from an upright position toward a fully deployed or berthed configuration). The seatback linkages are in turn driven by the reclining motion of the seatback. The tubular member holds path followers (e.g., on either side of the seat) in an arcuate path and, when driven by the seatback linkages, drives the path followers forward from a rear endpoint of the arcuate path (corresponding to the upright configuration of the passenger seat) to a forward endpoint of the arcuate path (e.g., corresponding to a fully deployed or berthed configuration). The path followers in turn drive forward mechanism links which deploy the leg rest at a variable rate based on the arcuate path.

In some embodiments, the seatback linkages are configured to lock the path followers at intermediate positions within the arcuate path, e.g., in the absence or stoppage of the reclining motion.

In some embodiments, the intermediate positions include a relative minimum of the arcuate path and a corresponding partially deployed leg rest (e.g., and partially reclined seatback).

In some embodiments, the reclining motion of the seatback is manually driven by the occupying passenger.

In some embodiments, the reclining motion of the seatback is driven by motorized actuators capable of activation and deactivation by the occupying passenger.

In some embodiments, the arcuate path is divided into multiple segments, e.g., an initial segment including the rear endpoint and a subsequent segment following the initial segment (e.g., through which the path followers travel after passing through the initial segment), and the leg rest is configured for deployment at variable rates through the initial and subsequent segments.

In some embodiments, the leg rest deploys at a faster or increasing rate through the initial segment and deploys at a slower or decreasing rate through the subsequent segment or segments.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIGS. 2B and 2C are partial right-side profile views of the passenger seat of FIG. 1 with the leg rest in partially deployed configurations;

DETAILED DESCRIPTION

Figure 1:
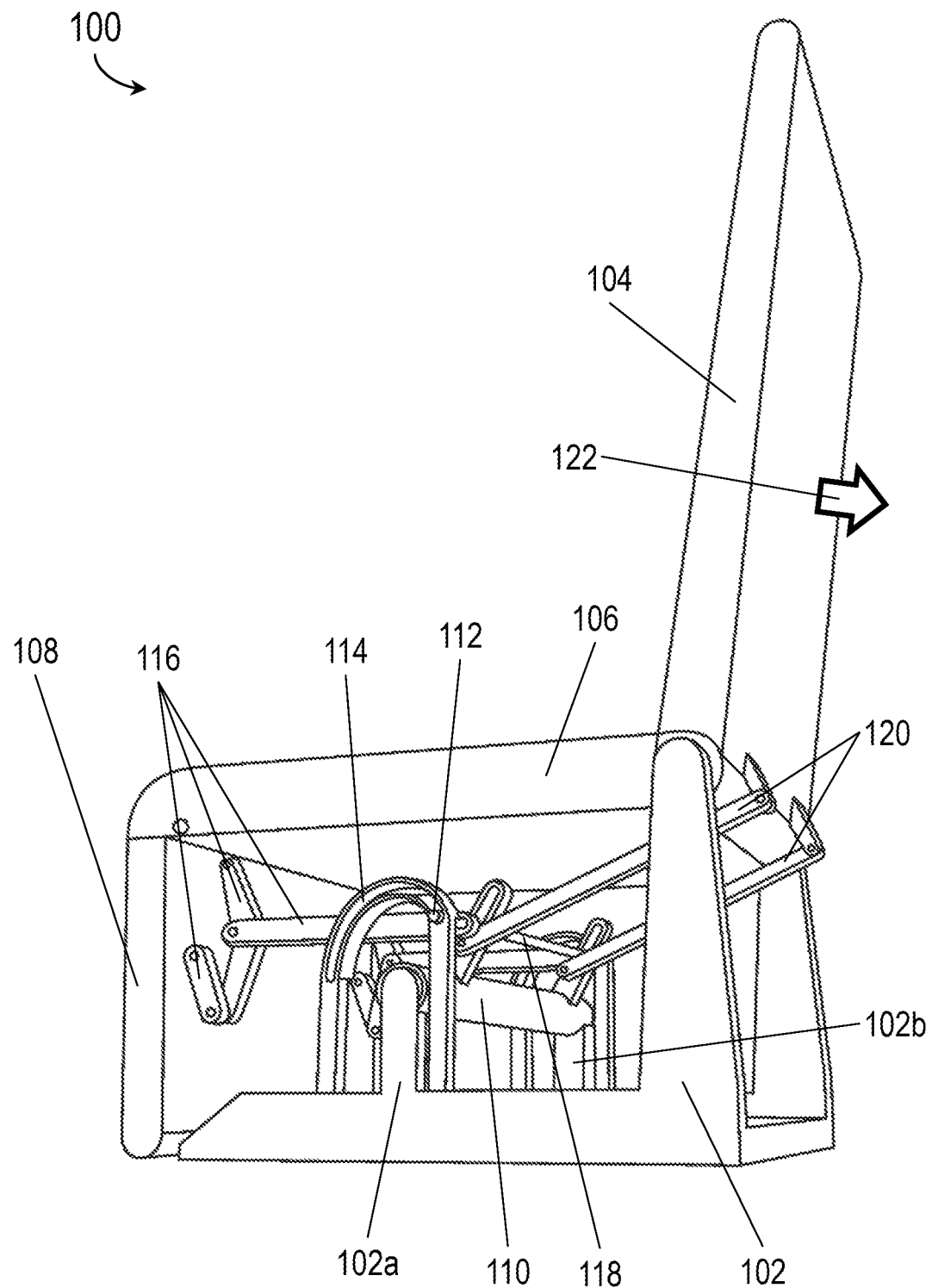
FIG. 1 is a rear isometric view of a passenger seat according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, a passenger seat incorporating a linked leg rest mechanism (e.g., linked to the reclining of the seatback without independent leg rest actuation) providing nonlinear deployment of the leg rest with minimal added complexity and weight is disclosed. In embodiments, the leg rest mechanism incorporates a lightweight structure (e.g., including tubular or hollow members) and cam followers driven by linkages or actuators linked to the reclining seatback in an angular motion through a curved path which dictates the variable deployment rate of the leg rest. For example, the precise curvature of the path may be customized to achieve optimal deployment of the leg rest for intermediate reclining configurations of the passenger seat between the upright (e.g., undeployed) and berthed (e.g., fully reclined and deployed) configurations.

Referring in particular to FIG. 1, a passenger seat 100 is disclosed. The passenger seat 100 may include a seat frame 102, seatback 104, seatpan 106, leg rest 108, tubular member 110, path followers 112, arcuate path 114, leg rest mechanism links 116, path follower rod 118, and seatback linkages 120 (e.g., backrest linkages, rear linkages).

In embodiments, the passenger seat 100 may incorporate a lightweight and low-profile mechanism for deploying the leg rest 108 in a nonlinear (e.g., variable-rate) fashion. For example, the passenger seat 100 may accommodate a seated passenger wishing to raise his/her legs to an elevated position, e.g., while reclining the seatback 104. In contrast to conventional linear deployment systems which deploy the leg rest 108 at a constant rate, which may not be optimal for all positions or configurations of a passenger seat and/or leg rest, the passenger seat 100 may allow for deployment of the leg rest 108 at a variable rate that provides an optimally comfortable position of the leg rest throughout deployment of the leg rest from an undeployed (e.g., upright, seated, substantially vertical) configuration to a fully deployed (e.g., berthed, substantially horizontal) configuration and at any intermediate point therebetween. The passenger seat 100 may provide an optimal degree of comfort to, e.g., premium economy or business jet passengers with minimal added weight and complexity.

In embodiments, the passenger seat 100 may incorporate the tubular member 110 as a bridging tube or generally tubular structure extending between the left side (102a) and the right side (102b) of the seat frame 102 and holding the path followers 112 in a fixed relationship to the tubular member. The seat frame 102 may be fixed to the cabin floor (e.g., via track fittings attached to tracks set into the cabin floor) or, in some embodiments, may include a tracking or swiveling system for tracking or rotating the passenger seat 100 as a whole relative to the cabin floor.

In embodiments, the path followers 112 may be fixed to the tubular member 110 at or near the left and right sides 102a-b of the seat frame 102. For example, the path followers 112 may be fixed to either end of the path follower rod 118 extending substantially parallel to the tubular member 110 (e.g., the path follower rod may itself be a substantially tubular structure). Similarly, the arcuate path 114 may be fixed to the seat frame 102 on the left and right sides 102a-b, such that a path follower 112 tracks through an arcuate path 114 on either side of the passenger seat 100. In embodiments, the tubular member 110 may pivot relative to the seat frame 102, the pivoting of the tubular member (e.g., forward or backward relative to the seat frame) driving the path follower 112 through the arcuate path 114 on one or both sides of the passenger seat 100. For example, the arcuate path 114 may extend in a non-linear (e.g., curved) fashion between two ends (e.g., endpoints, termini).

In embodiments, the pivoting of the tubular member 110 may be manually driven by the seatback linkages 120, the seatback linkages driven forward or backward by a reclining motion (or, e.g., a reverse reclining motion) of the seatback 104 e.g., manually or automatically driven by the seated passenger backrest linkages. In embodiments, when the seated passenger reclines (122) the seatback 104, the seatback linkages 120 may drive the pivoting of the tubular member 110 and drive the path followers 112 through the arcuate path 114, deploying the leg rest 108. In some embodiments, the leg rest 108 may reach a substantially horizontal configuration (see, e.g., FIG. 2D below) and the seatback 104 may recline fully, resulting in a berthed configuration where the seatback 104, seatpan 106, and leg rest 108 are substantially coplanar. The leg rest 108 may be returned to its upright undeployed configuration by a restoration (e.g., manual or automatic) of the seatback 104 to its corresponding upright (e.g., non-reclined) configuration.

Referring to FIGS. 2A through 2E, the passenger seat 100 is disclosed.

Figure 2A:
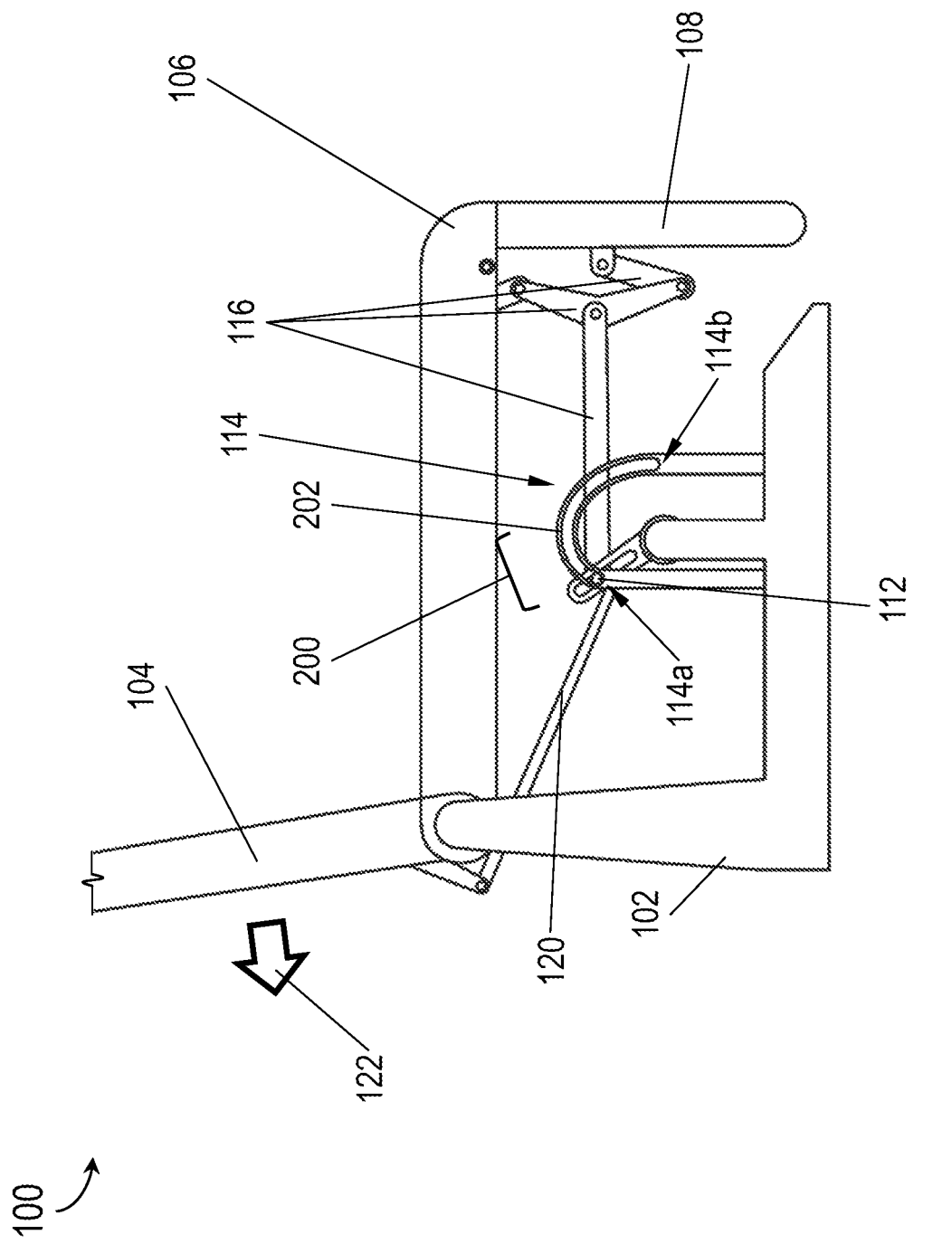
FIG. 2A is a partial right-side profile view of the passenger seat of FIG. 1 with a leg rest in an undeployed configuration.
Figure 2B:
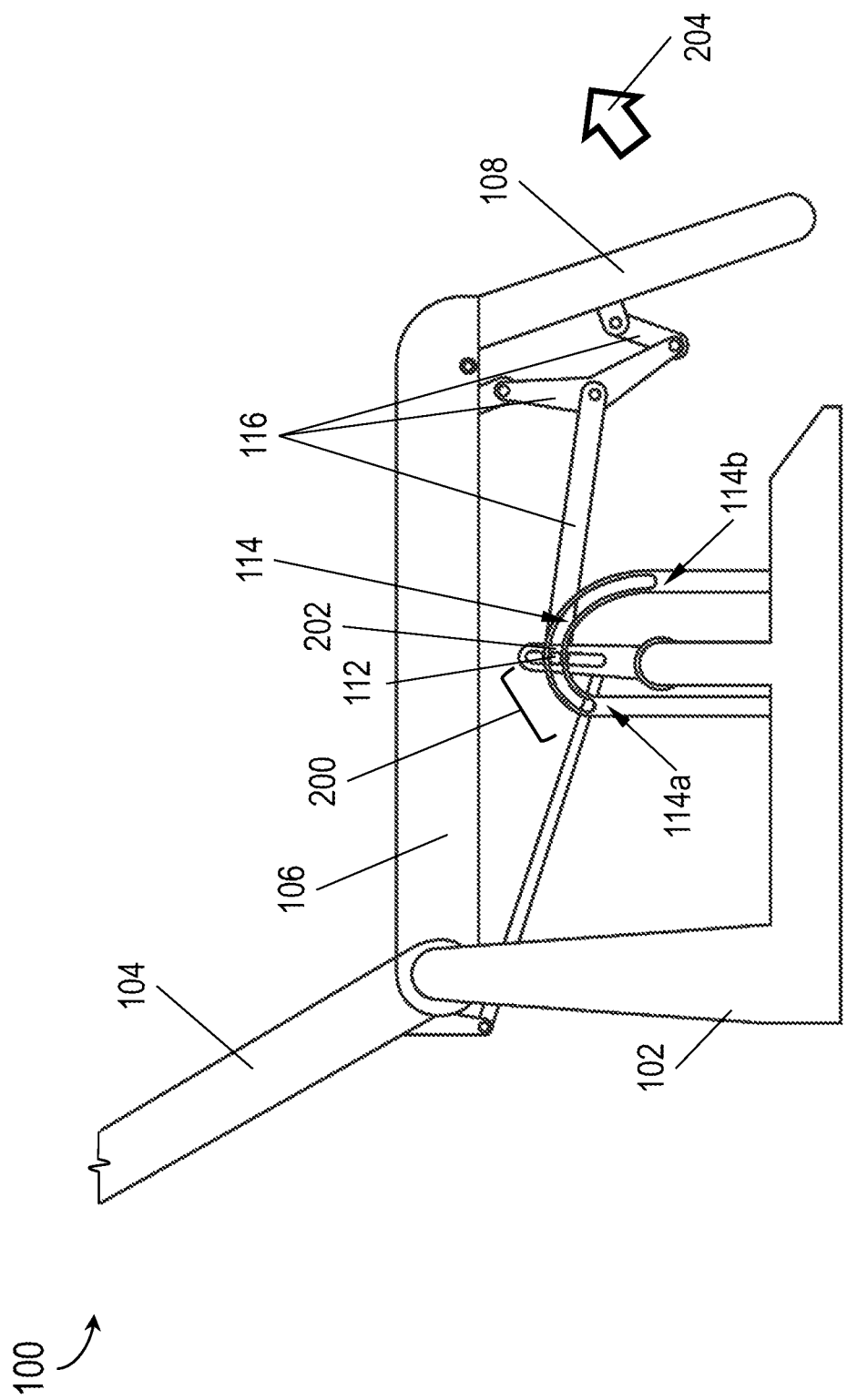

In embodiments, referring in particular to FIGS. 2A and 2B, the path followers 112 may be at or near the starting point 114a of the arcuate path 114 when the leg rest 108 is in an upright or undeployed configuration (e.g., substantially vertical). For example, the arcuate path 114 may include, but is not limited to, the curved path shown by, e.g., FIG. 2A. The arcuate path 114 may include a first segment 200 (e.g., between the starting point 114a and an apex 202, e.g., maximum point) wherein the path follower 112 rises through the arcuate path.

In embodiments, while the path followers 112 are driven forward through the first segment 200, the leg rest 108 may deploy at a relatively faster or increasing rate to the partially deployed configuration shown by FIG. 2B, wherein the path followers 112 are at or near the apex 202 of the arcuate path 114. For example, the tubular member 110 may pivot, driven by the seated passenger (e.g., via the seatback linkages 120, driven by reclining (122) the seatback 104); the leg rest mechanism links 116 may drive the leg rest 108 outward and upward (204) relative to the seatpan 106 and seat frame 102.

In some embodiments, the passenger seat 100 may include a mechanism for locking or securing the path followers 112 at one or more intermediate points on the arcuate path 114, e.g., between the starting point 114a and endpoint 114b, and accordingly securing the leg rest 108 in a corresponding partially deployed configuration. For example, when the motion of the path followers 112 through the arcuate path 114 (and therefore the deployment of the leg rest 108) is driven by the reclining motion 122 upon of the seatback 104, the absence or stoppage of the reclining action before full deployment may stop and lock the path follower in the current intermediate position within the arcuate path, locking the seatback and leg rest in the corresponding partially deployed configurations.

Figure 2D:
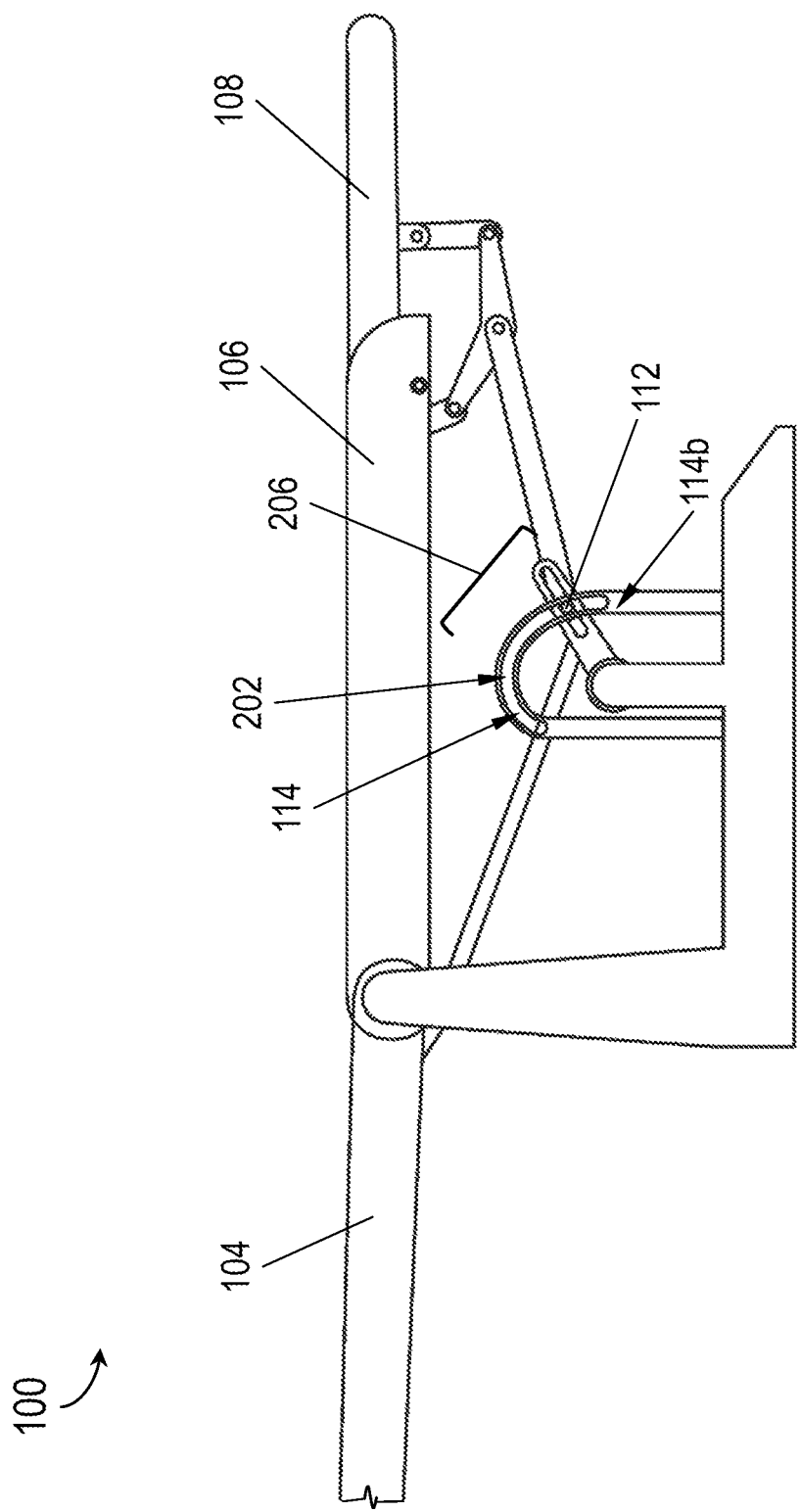
FIG. 2D is a partial right-side profile view of the passenger seat of FIG. 1 with the leg rest in a fully deployed configuration.

Referring also to FIGS. 2C and 2D, the arcuate path 114 may include a second segment 206, e.g., between the apex 202 and the endpoint 114b. For example, from the partially deployed configuration shown by FIG. 2B (e.g., wherein the path follower 112 is at or near the apex 202), the path followers 112 may continue to be driven forward through the second segment 206 in a downward arc relative to the seat frame 102 (or, e.g., to the cabin floor) toward a fully deployed (e.g., berthed) configuration as shown by FIG. 2D, wherein the seatback 104, seatpan 106, and leg rest 108 are substantially coplanar. In embodiments, as the path followers 112 translate downward through the second segment 206, the path followers may be driven, and the leg rest 108 may in turn be driven to deploy (208), at a relatively slower or decreasing rate (e.g., relative to the faster or increasing initial deployment rate (204, FIG. 2B) as the path followers translate through the first segment 200).

Figure 2E:
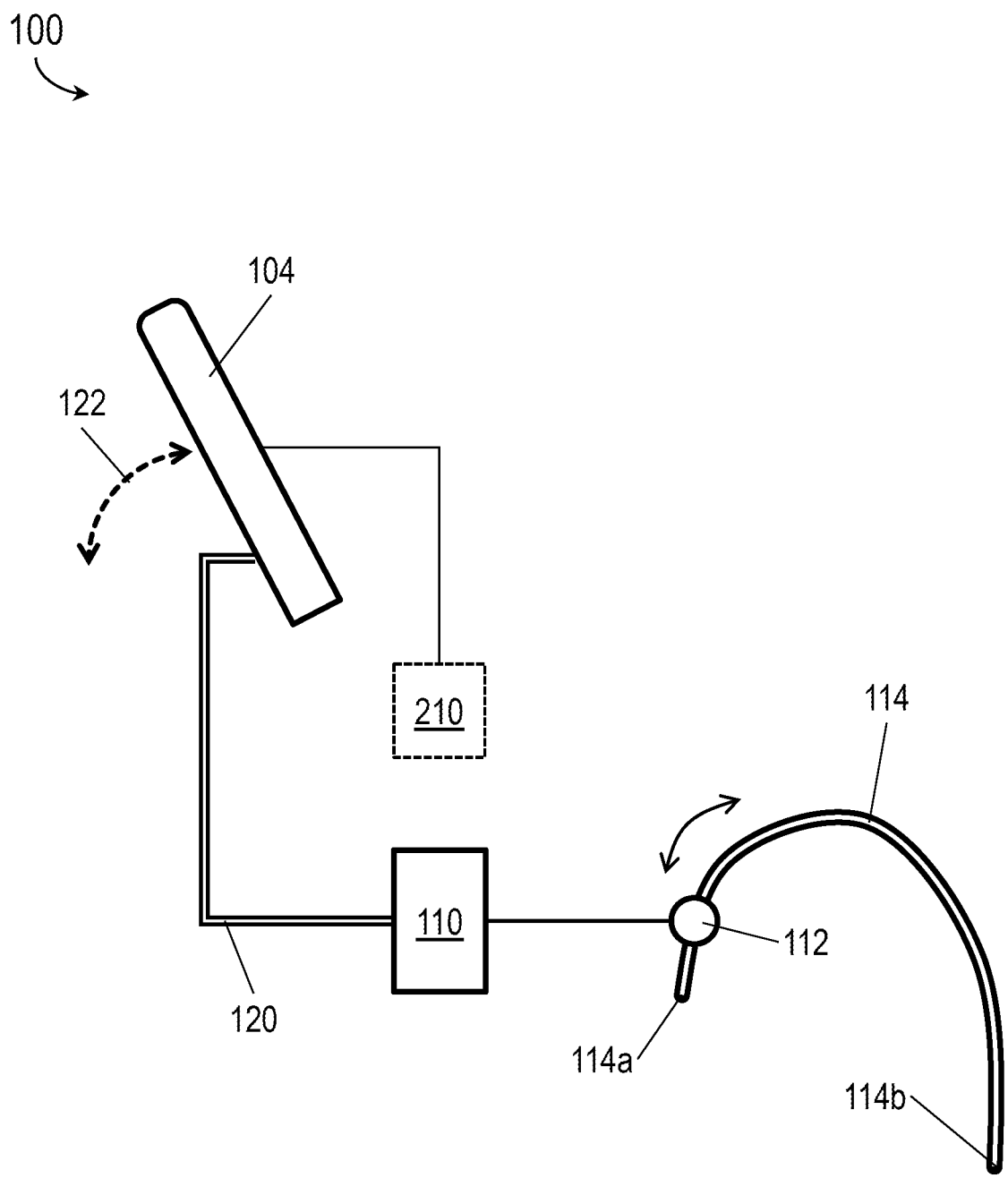
FIG. 2E is a diagrammatic illustration of the reclining motion of the seatback of the passenger seat of FIG. 1.

Referring also to FIG. 2E, the reclining motion 122 of the seatback 104 may be manually or automatically driven, e.g., by the passenger occupying the passenger seat 100. In embodiments, the reclining motion 122 may be driven by one or more motorized actuators 210. For example, the passenger may activate the motorized actuators 210 to recline 122 the seatback 104 toward the berthed configuration shown by FIG. 2D (or, alternatively, return the seatback forward toward the upright configuration shown by FIG. 2A). The reclining motion 122 may drive the seatback linkages 120, which in turn may drive the tubular member 110, which may drive the path followers 112 forward or backward through the arcuate path 114 (e.g., relative to the endpoints 114a-b), raising or lowering the leg rest (108, FIG. 2D).

In embodiments, the path followers 112 may be configured for braking and locking at any intermediate point on the arcuate path 114, thereby locking the leg rest 108 in the corresponding orientation (e.g., undeployed, partially deployed, fully deployed). For example, the motorized actuators 210 may be configured to stop the path followers 112 at any intermediate point when no longer activated. Additionally, or alternatively, the reclining motion 122 may be manually driven by the occupying passenger. For example, the seatback 104 may incorporate spring counterbalances capable of manually braking the seatback at one or more intermediate positions between its upright and berthed configurations, similarly locking the path followers 112 in the corresponding intermediate position along the arcuate path 114 and locking the leg rest 108 in the corresponding configuration.

Figure 3A:
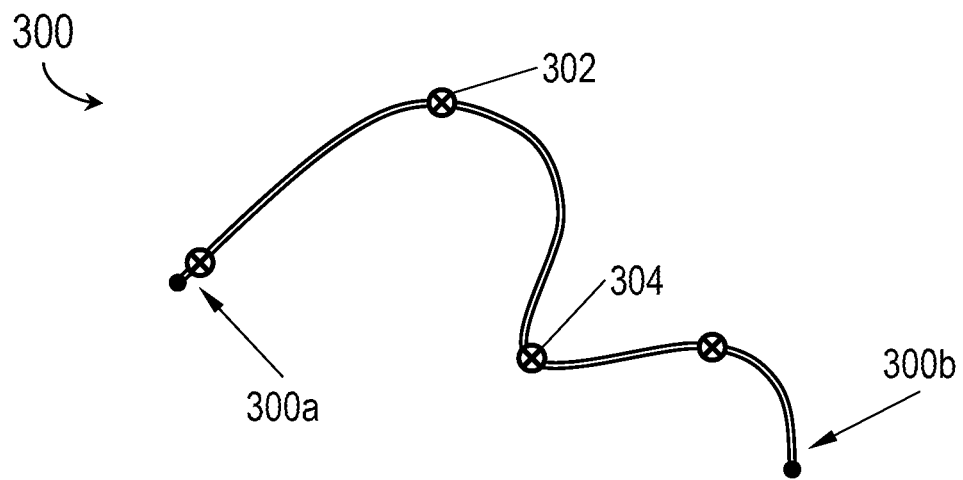
FIG. 3A is a diagrammatic illustration of an arcuate path of the passenger seat of FIG. 1.
Figure 3B:
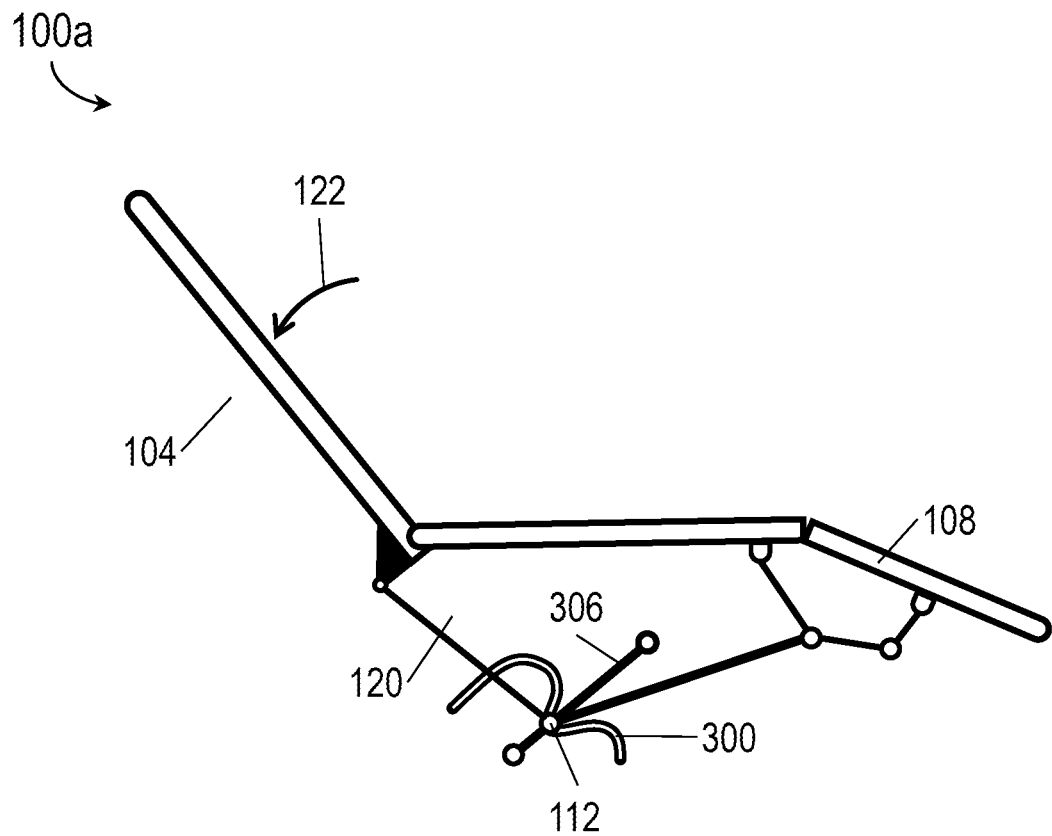
FIG. 3B is a diagrammatic illustration of the passenger seat of FIG. 1 incorporating the arcuate path of FIG. 3A.

In embodiments, the arcuate path (114, FIG. 1) is not limited to the configuration shown by FIGS. 1 through 2D, nor to circular and/or elliptical arcs generally. Referring to FIGS. 3A and 3B, the arcuate path 300 and the passenger seat 100a incorporating the arcuate path 300 may be implemented and may function similarly to the arcuate path 114 and passenger seat 100 shown by FIGS. 1 through 2D, except that the arcuate path 300 may be customized for variable rates of deployment through individual segments of the arcuate path. For example, the arcuate path 300 may include, between its starting point 300a and endpoint 300b, an apex 302 or relative maximum as well as a relative minimum 304. The relative minimum 304 may correspond to a desirable partially deployed configuration of the leg rest 108, to which the path followers 112 may be driven (e.g., via seatback linkages 120 driven by the reclining motion 122 of the seatback 104) and at which the path follower may be locked or secured.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:
1. An aircraft passenger seat, comprising:
a seat frame pivotably coupled to a seatback, the seat frame and seatback collectively configured to accommodate at least one passenger;
a deployable leg rest configured to accommodate at least one leg of the passenger when not in an undeployed configuration;
at least one tubular member extending between a left side and a right side of the passenger seat, the tubular member operatively coupled to the seatback by at least one seatback linkage configured for articulation by a reclining motion of the seatback;

at least one path follower operatively coupled to the at least one seatback linkage, the at least one seatback linkage configured to drive the at least one path follower through an arcuate path between a rear endpoint associated with the undeployed configuration of the leg rest and a forward endpoint associated with a fully deployed configuration of the leg rest when the at least one seatback linkage is articulated;

and at least one forward mechanism link operatively coupled to the at least one path follower and to the leg rest, the at least one forward mechanism link configured to be driven by the at least one path follower to deploy the leg rest at a variable rate corresponding to the arcuate path.

2. The passenger seat of claim 1, wherein the at least one seatback linkage is configured to lock the at least one path follower in one or more intermediate positions between the rear endpoint and the forward endpoint of the arcuate path.

3. The passenger seat of claim 2, wherein the one or more intermediate positions include at least one intermediate position associated with a relative minimum of the arcuate path and with a partially deployed configuration of the leg rest.

4. The passenger seat of claim 1, wherein the reclining motion of the seatback is manually driven by the passenger.

5. The passenger seat of claim 1, further comprising:
at least one motorized actuator operatively coupled to the seatback,
wherein the reclining motion of the seatback is driven by the at least one motorized actuator.

6. The passenger seat of claim 1, wherein:
the arcuate path includes at least one intermediate point dividing the arcuate path into a first segment and a second segment;
and
the leg rest is configured for deployment at a first rate corresponding to the first segment and a second rate corresponding to the second segment.

7. The passenger seat of claim 6, wherein:
the first rate is an increasing rate of deployment;
and
the second rate is a decreasing rate of deployment.

* * * * *